US011950146B2

(12) United States Patent
Yiu et al.

(10) Patent No.: US 11,950,146 B2
(45) Date of Patent: Apr. 2, 2024

(54) PDCP AND ROHC HANDLING FOR MULTI-CONNECTIVITY HANDOVER

(71) Applicant: Apple Inc., Cupertino, CA (US)

(72) Inventors: Candy Yiu, Portland, OR (US); Yujian Zhang, Beijing (CN); Yi Guo, Shanghai (CN); Jaemin Han, Portland, OR (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 17/274,311

(22) PCT Filed: Sep. 23, 2019

(86) PCT No.: PCT/US2019/052412
§ 371 (c)(1),
(2) Date: Mar. 8, 2021

(87) PCT Pub. No.: WO2020/068659
PCT Pub. Date: Apr. 2, 2020

(65) Prior Publication Data
US 2022/0053389 A1     Feb. 17, 2022

Related U.S. Application Data

(60) Provisional application No. 62/737,683, filed on Sep. 27, 2018.

(51) Int. Cl.
*H04W 36/00* (2009.01)
*H04W 12/037* (2021.01)
(Continued)

(52) U.S. Cl.
CPC ..... *H04W 36/0069* (2018.08); *H04W 12/037* (2021.01); *H04W 12/0431* (2021.01);
(Continued)

(58) Field of Classification Search
None
See application file for complete search history.

(56) References Cited

U.S. PATENT DOCUMENTS

2012/0014357 A1  1/2012 Jung et al.
2012/0218973 A1  8/2012 Du et al.
(Continued)

FOREIGN PATENT DOCUMENTS

EP  3358901       8/2018
WO  2012146276 A1  11/2012
(Continued)

OTHER PUBLICATIONS

Mediatek Inc, et al., "Mobility Enhancement for '0ms' Interruption"; 3GPP TSG-RAN WG2 NR; R2-1700897 (Revision of R2-1700244); Jan. 2017; Spokane, USA; 5 pgs, Best Available Date: Jan. 17-19, 2017.

(Continued)

*Primary Examiner* — San Htun
(74) *Attorney, Agent, or Firm* — Kowert, Hood, Munyon, Rankin & Goetzel, P.C.

(57) ABSTRACT

Techniques to configure a user equipment (UE) for a multi-connectivity handover with a source base station (SBS) and a target base station (TBS) include encoding a measurement report for transmission to the SBS. The measurement report is triggered based on a measurement event configured by the SBS. Radio resource control (RRC) signaling from the SBS is decoded, the RRC signaling including a handover command in response to the measurement report. The handover command includes an indication for multi-connectivity support by the SBS and the TBS during the handover. A first protocol stack associated with the SBS and a second protocol stack associated with the TBS are configured at the UE. A packet data convergence protocol (PDCP) protocol data unit (PDU) received at the UE during the handover is (Continued)

processed using the first protocol stack or the second protocol stack.

14 Claims, 6 Drawing Sheets

(51) Int. Cl.
   *H04W 12/0431* (2021.01)
   *H04W 28/06* (2009.01)
   *H04W 76/30* (2018.01)

(52) U.S. Cl.
   CPC ....... *H04W 28/06* (2013.01); *H04W 36/0058* (2018.08); *H04W 36/00837* (2018.08); *H04W 76/30* (2018.02)

(56) References Cited

U.S. PATENT DOCUMENTS

| | | | |
|---|---|---|---|
| 2014/0241317 A1* | 8/2014 | Jamadagni | H04W 36/28 370/329 |
| 2015/0264609 A1* | 9/2015 | Zhang | H04W 76/27 455/436 |
| 2016/0219475 A1* | 7/2016 | Kim | H04W 76/15 |
| 2016/0262066 A1* | 9/2016 | Ozturk | H04W 76/30 |
| 2016/0286449 A1 | 9/2016 | Choi et al. | |
| 2017/0086106 A1* | 3/2017 | Yiu | H04W 36/0072 |
| 2018/0098250 A1 | 4/2018 | Vrzic et al. | |
| 2019/0253945 A1* | 8/2019 | Paladugu | H04W 36/0069 |

FOREIGN PATENT DOCUMENTS

| | | |
|---|---|---|
| WO | 2015138069 A1 | 9/2015 |
| WO | WO-2016119210 A1 * | 8/2016 |
| WO | 2017/138978 A1 | 8/2017 |
| WO | 2020068651 | 4/2020 |

OTHER PUBLICATIONS

Huawei, et al., "Comparison of 0ms Interruption Solutions"; 3GPP TSG-RAN WG2 Ad Hoc NR #2; R2-1706707; Jun. 2017; Qingdao, China; 8 pgs, Best Available Date: Jun. 27-29, 2017.

ZTE Corporation, "Discussion on Data Forwarding in Mobility Enhancement Solutions"; 3GPP TSG-RAN WG3 Meeting #92; R3-161144; May 2016; Nanjing, China; 5 pgs, Best Available Date: May 23-27, 2016.

Extended European Search Report; European Application No. 19866019.3; dated Oct. 11, 2021; 16 pgs.

3rd Generation Partnership Project; Technical Specification Group Radio Access Network; "Evolved Universal Terrestrial Radio Access (E-UTRA) and NR; Multi-Connectivity", Stage 2 (Release 15), 3GPP, TS 37.340, V15.3.0, Sep. 25, 2018, 59 pgs, Best Available Date: Sep. 2018.

International Search Report and Written Opinion for International Application No. PCT/US2019/052412, dated Jan. 10, 2020, 7 pgs.

Extended European Search Report for EP Patent Application No. 23199059.9; dated Nov. 21, 2023.

NEC "Introduction to Dual Connectivity"; 3GPP TSG-RAN WG2 Meeting #88 R2-145424 R3-143095; Nov. 17, 2014, Best Available Date: Nov. 17-21, 2014.

* cited by examiner

PDCP AND ROHC HANDLING FOR MULTI-CONNECTIVITY HANDOVER

PRIORITY CLAIM

This application is a U.S. National Stage filing of International Application No. PCT/US2019/052412, filed Sep. 23, 2019, which claims the benefit of and priority to the U.S. Provisional Application No. 62/737,683, filed Sep. 27, 2018. All of the aforementioned applications are incorporated herein by reference in their entireties.

TECHNICAL FIELD

Aspects pertain to wireless communications. Some aspects relate to wireless networks including 3GPP (Third Generation Partnership Project) networks, 3GPP LIE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for packet data convergence protocol (PDCP) and robust header compression (ROHC) handling for multi-connectivity handover in wireless networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATS) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. Muite-Fire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for PDCP and ROHC handling for multi-connectivity handover in wireless networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
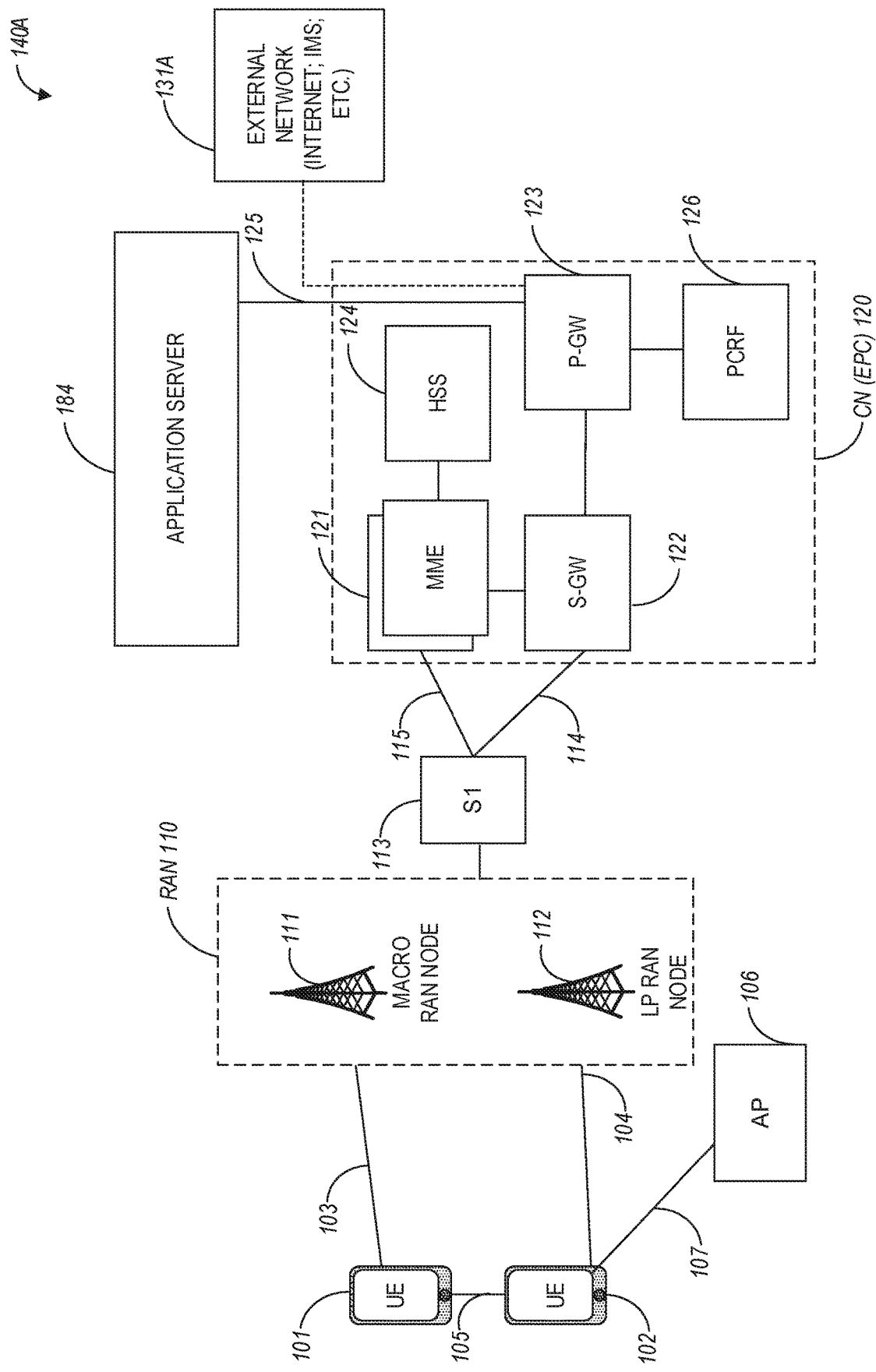
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the LTEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or MT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an Si interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network. One of the current enablers of IoT is the narrowband-IoT (NB-IoT).

An NG system architecture can include the RAN 110 and a 5G network core (SGC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
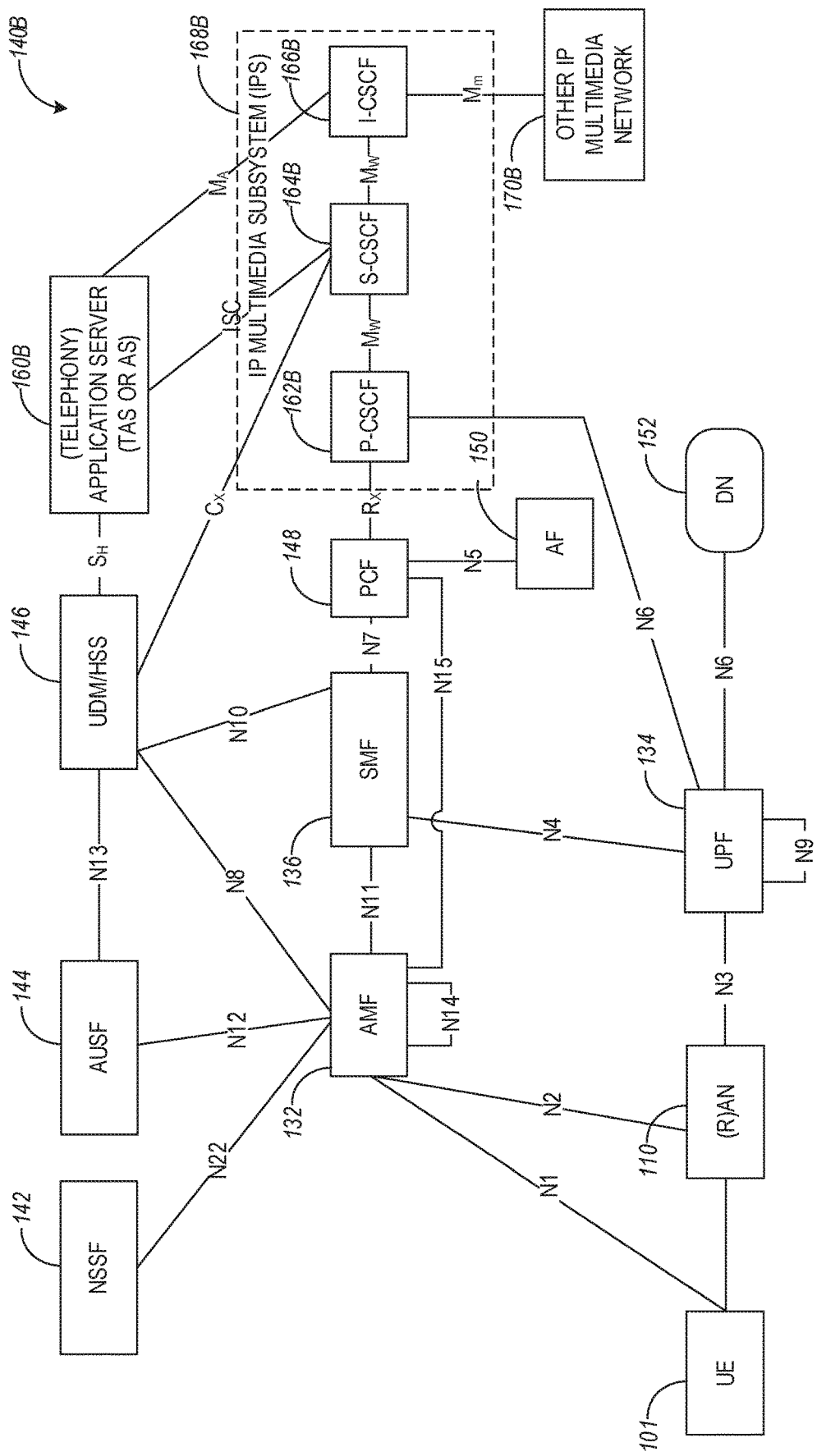
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (SGC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 1409 includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 19), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In sonic aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
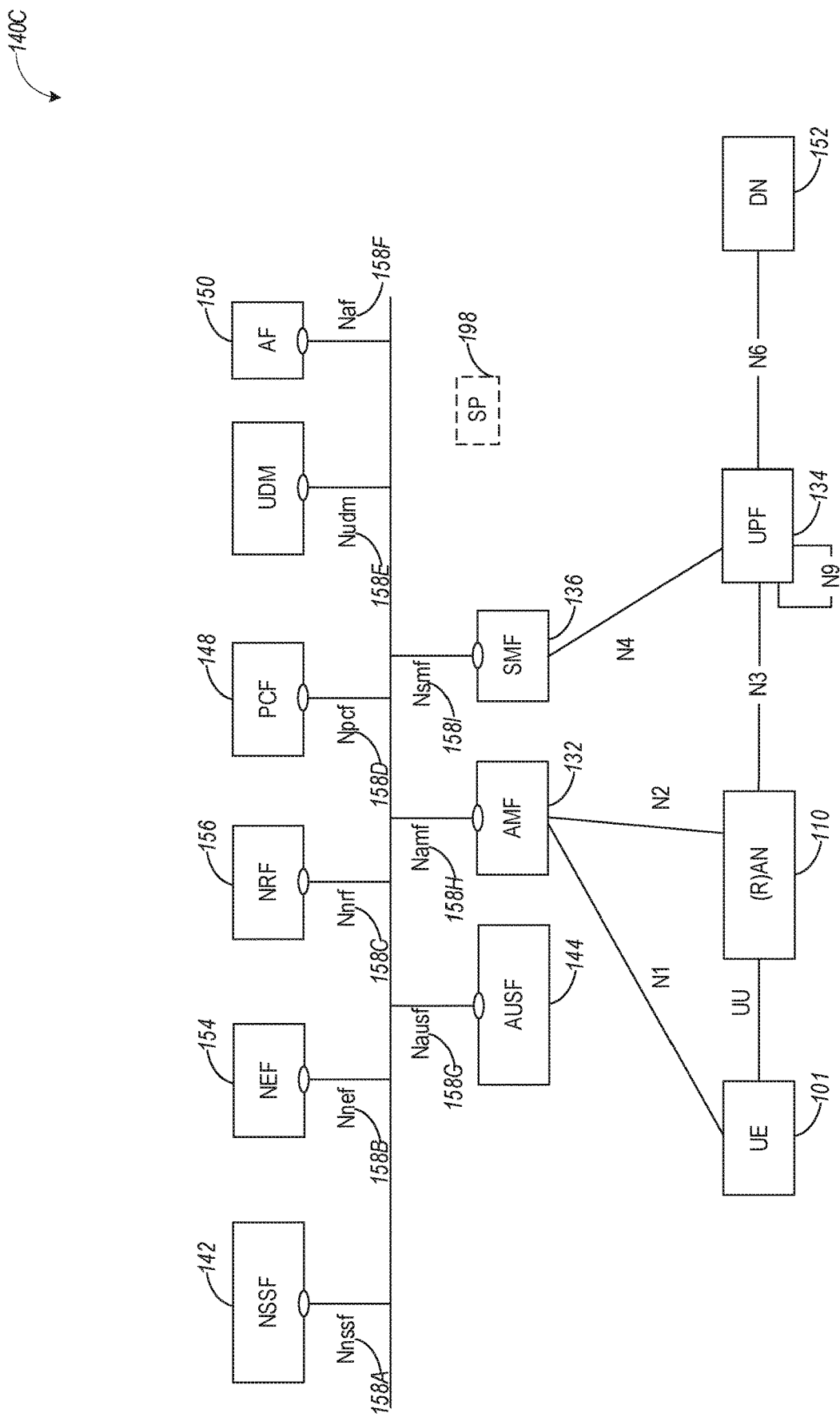

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some aspects, handover in NR high-frequency range with beamforming may increase interruption time in comparison to LTE systems due to a beam sweep delay. Reliability reduction due to beamforming characteristics provides smaller coverage. In order to achieve 0ms interruption, multi-connectivity handover may be used. Techniques discussed herein can be used for PDCP and ROHC handling for multi-connectivity handover (HO).

Figure 2:
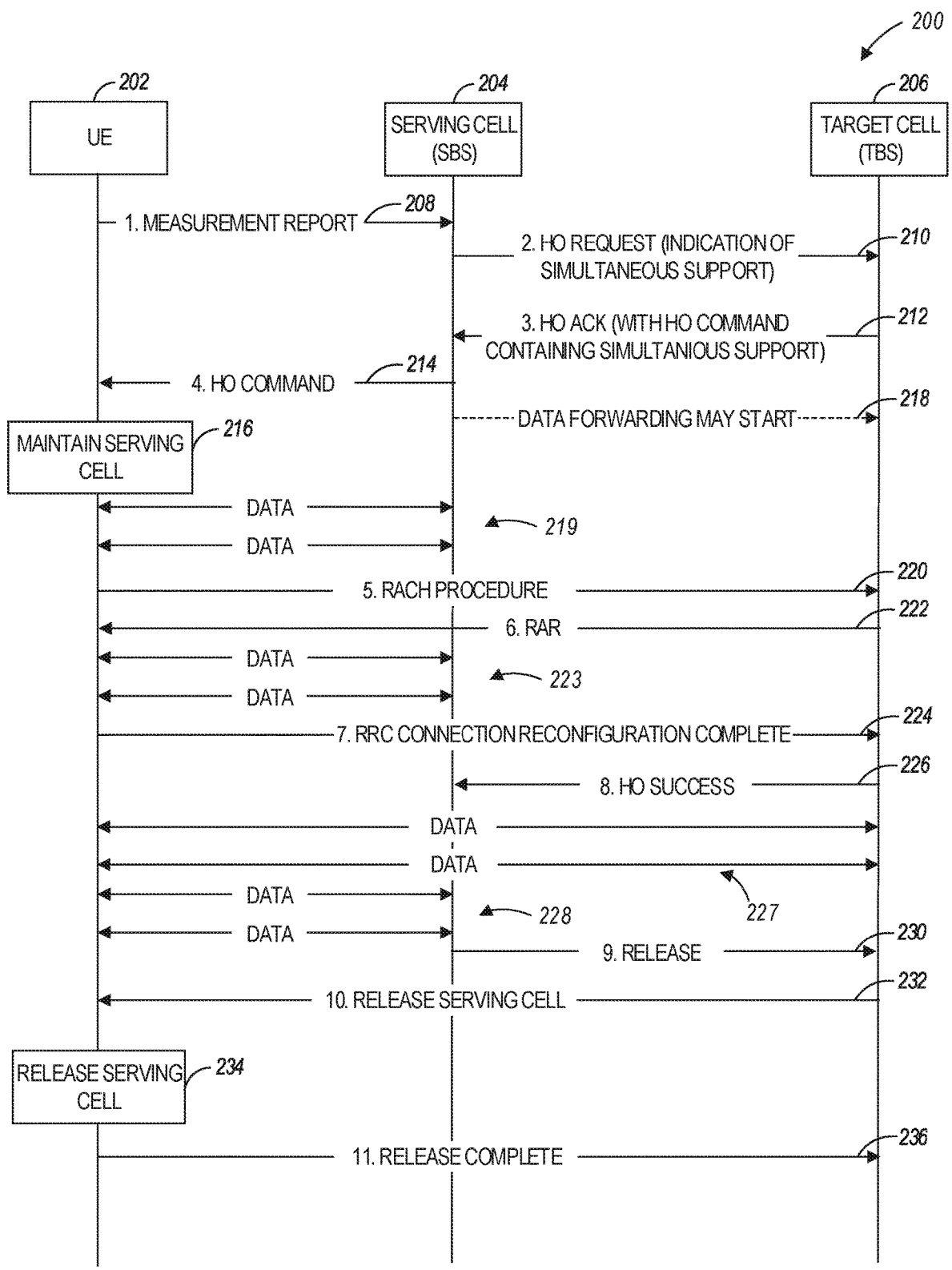
FIG. 2 illustrates a swimlane diagram of a handover using multi-connectivity, in accordance with some aspects.

FIG. 2 illustrates a swimlane diagram 200 of a handover using multi-connectivity, in accordance with some aspects. FIG. 2 shows the signaling flow of a multi-connectivity handover between a UE 202, a source cell 204, and a target cell 206. The serving cell is also referred to as a Serving Base Station (SBS), and the target cell is referred to as a Target Base Station (TBS).

Referring to FIG. 2, at operation 208, a measurement report is triggered based on a measurement event. The measurement event can be configured prior to operation 208, by the source cell 204.

At operation 210, the source cell 204 can make a handover (HO) decision based on the received measurement report and communicates a handover request to the target cell 206. The handover request can include a simultaneous link enable indication (e.g., an indication that the SBS supports a multi-connectivity handover).

At operation 212, the target cell 206 communicates a handover acknowledgment to the source cell 204. The handover acknowledgment can include an indication that the target cell 206 supports multi-connectivity (e.g., during a handover). The handover acknowledgement further includes required HO parameters such as random access channel (RACH) procedure parameters, as well as dedicated Transport Network Layer (TNL) information for forwarding partial PDCP PDUs (e.g., PDCP PDUs that have been compressed with ROHC and have an allocated sequence number, or SN, for forwarding by the SBS to the TBS). If the TBS does not support multi-connectivity, the TBS may reject a multi-connectivity HO and may proceed with a regular HO. In this case, the target cell 206 communicates an HO command in the HO acknowledgment with indication of no multi-connectivity support.

At operation 214, the source cell 204 communicates a handover command (e.g., the handover command received with the handover acknowledgment at operation 212, with the HO command indicating support by the SBS and the TBS for multi-connectivity HO).

After the HO command is communicated at operation 214, data forwarding from the SBS to the TBS may start at operation 218. At operation 216, the UE 202 maintains connectivity with the serving cell 204. At operation 219, data may be communicated between the UE 202 and the SBS 204 during the HO.

At operation 220, the UE 202 performs a RACH procedure to access the target cell 206, using the RACH information in the HO command provided by the target cell 206. At operation 222, the target cell communicates a RACH response (RAR) for a successful RACH procedure.

At operations 223, the UE 202 continues to communicate with the serving cell 204 during the HO.

At operation 224, the UE 202 communicates an RRC Connection Reconfiguration Complete message to the target cell 206 to indicate HO completion. At operation 226, the target cell 206 communicates an HO success indication to the serving cell 204.

At operation 227, the UE 202 communicates with the target cell 206, and at operation 228, the UE 202 communicates with the serving cell 204.

At operation 230, the serving cell 204 communicates a release message to the target cell 206. At operation 232, the target cell 206 communicates a serving cell release message to the UE 202. At operation 234, the UE 202 releases the serving cell 204. At operation 236, the UE 202 communicates a release completion message to the target cell 206.

As illustrated in FIG. 2, during a multi-connectivity HO, the UE will go through the following 3 phases: a single connection with the serving cell (this is before the handover starts); a multi-connection with both the serving and the target cell (this is during the handover); and a single connection with the target cell (this is after the serving cell is released).

In aspects when a non-split bearer architecture is used, after the HO command is received, the UE will receive two streams of data (one from the source cell and one from the target cell) during the handover. In this regard, the UE may merge and reorder the PDCP packets across the source PDCP and the target PDCP in the SBS and TBS protocol stacks at the UE.

Figure 3:
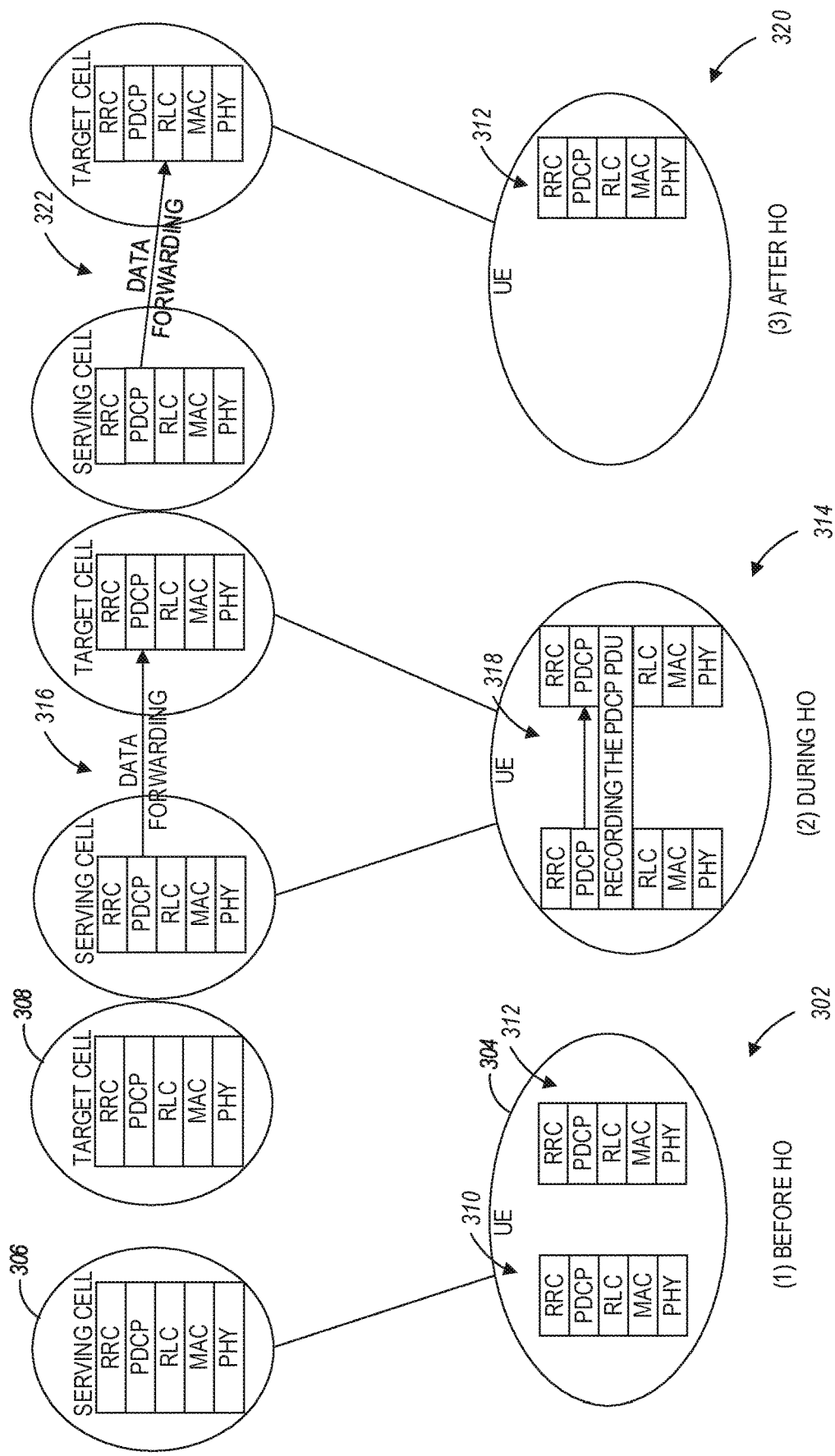
FIG. 3 illustrates PDCP and ROHC handling before, during, and after a multi-connectivity handover, in accordance with some aspects.

FIG. 3 illustrates PDCP and ROHC handling before, during, and after a multi-connectivity handover, in accordance with some aspects. Referring to FIG. 3, diagram 302 illustrates PDPC and ROHC handling before the handover (e.g., before the LIE receives the HO command). At this phase of the HO, the UE 304 connects only to the serving cell 306 and uses protocol stack 310 to process PDCP PDUs from the serving cell. After the UE receives the HO command with simultaneous connection (i.e., multi-connectivity) enabled during HO, the LYE configures a new (second) protocol stack 312 for the target cell 308. When the target cell 308 sends data to the UE 304, the data will go to the corresponding protocol stack—310 (for data originating from the serving cell 306, sent by the serving cell to the target cell, and forwarded by the target cell to the UE) or 312 (for data originating from and sent by the target cell).

Additionally, the UE 304 can be configured with two sets of security keys—one set for communications with the serving cell 306 and another set for communications with the target cell 308.

During the processing of source cell PDCP PDUs, the source cell performs compression via ROHC and allocates a sequence number (SN) for the PDCP PDU. The PDCP PDU is then integrity protected and encrypted using the set of security keys associated with the serving cell. The encrypted PDCP PRDU is then communicated to the UE.

Diagram 314 illustrates PDCP and ROHC handling during the multi-connectivity handover (e.g., the HO illustrated in FIG. 2. Since source and target cells apply different security keys, the model for DL in the network side can be performed as discussed below in connection with packets forwarded to the target cell.

During the HO, after the UE has completed the RACH procedure and is connected with both the serving cell and the target cell (e.g., after operation 220 in FIG. 2), the serving cell starts forwarding PDCP packet to the target cell at operation 316. More specifically, the source cell 306 processes PDCP PDU packets by applying compression via ROHC and allocating an SN for the PDCP PDU. The source cell 306 then forwards the partial PDCP PDU (after ROHC) and the SN to the target cell 308 at operation 316. The target cell 308 only performs integrity protection and/or ciphering on the partial PDCP PDU (e.g., using the set of security keys associated with the target cell).

After the target cell forwards the PDCP PDU that originated at the serving cell, the following processing can be configured at the UE receiver side. More specifically, the TIE can initially perform a common operation with regard to the PDCP PDU received from the target cell, such as determine the PDCP PDU count (or SN). The UE performs separate operations for each of the communication links with the serving cell and the target cell, including performing integrity protection and deciphering (e.g., using a set of keys corresponding to the serving or target cell, based on which cell the PDCP PDU is received from). The received PDCP PDU, after integrity protection and deciphering, is stored in a common buffer (e.g., a buffer shared between the protocol stacks 310 and 312). After storage in the common buffer, PDCP PDU reordering 318 is performed (e.g., based on the SN and/or whether the PDCP PDU originates from the source or target cell), and then ROHC decompression is performed to decompress the reordered PDCP PDUs.

Diagram 320 illustrates PDCP and ROHC handling after the mufti-connectivity handover (e.g., the HO illustrated in FIG. 2). After the HO, the serving cell protocol stack 310 is removed by the UE. Any PDCP PDUs originating from the serving cell are forwarded in a data forwarding operation 322 from the PDCP layer at the serving cell to the radio link control (RLC) layer at the target cell 308, for communication to the UE 304.

Figure 4:
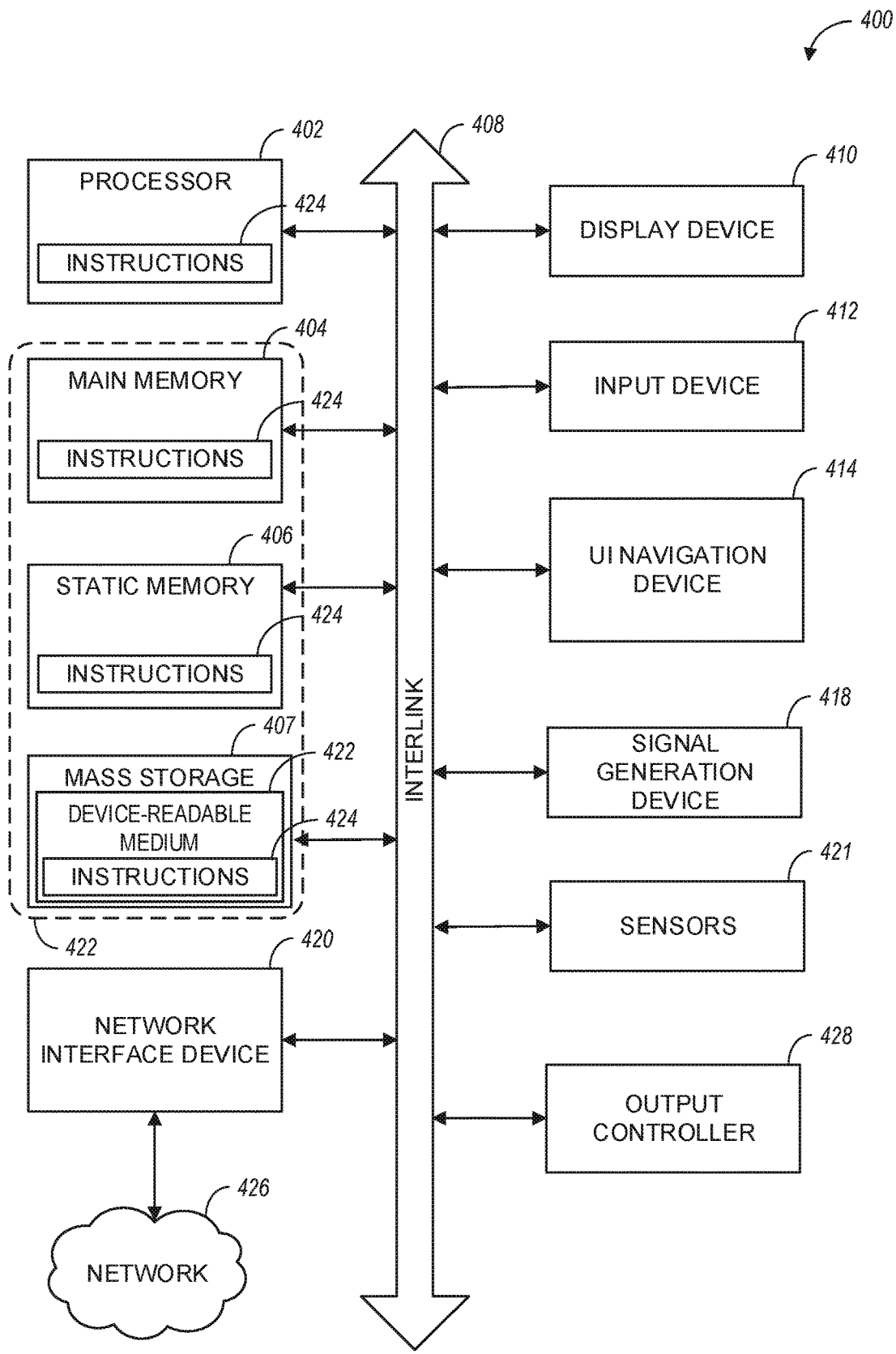
FIG. 4 illustrates a block diagram of a communication device such as an evolved Node-B (eNB), a new generation Node-B (gNB), an access point (AP), a wireless station (STA), a mobile station (MS), or a user equipment (LT), in accordance with some aspects.

FIG. 4 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 400 may operate as a standalone device or may be connected (e.g., networked) to other communication devices.

Circuitry (e.g., processing circuitry) is a collection of circuits implemented in tangible entities of the device 400 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 400 follow.

In some aspects, the device 400 may operate as a standalone device or may be connected (e.g., networked) to other devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 400 may include a hardware processor 402 (e.g., a central processing unit (CPU), a graphics processing unit (GPU), a hardware processor core, or any combination thereof), a main memory 404, a static memory 406, and mass storage 407 (e.g., hard drive, tape drive, flash storage, or other block or storage devices), some or all of which may communicate with each other via an interlink (e.g., bus) 408.

The communication device 400 may further include a display device 410, an alphanumeric input device 412 (e.g., a keyboard), and a user interface (UI) navigation device 414 (e.g., a mouse). In an example, the display device 410, input device 412 and UI navigation device 414 may be a touchscreen display. The communication device 400 may additionally include a signal generation device 418 (es., a speaker), a network interface device 420, and one or more sensors 421, such as a global positioning system (GPS) sensor, compass, accelerometer, or another sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 407 may include a communication device-readable medium 422, on which is stored one or more sets of data structures or instructions 424 (e.g., software) embodying or utilized by any one or more of the techniques or functions described herein. In some aspects, registers of the processor 402, the main memory 404, the static memory 406, and/or the mass storage 407 may be, or include (completely or at least partially), the device-readable medium 422, on which is stored the one or more sets of data structures or instructions 424, embodying or utilized by any one or more of the techniques or functions described herein. In an example, one or any combination of the hardware processor 402, the main memory 404, the static memory 406, or the mass storage 416 may constitute the device-readable medium 422.

As used herein, the term "device-readable medium" is interchangeable with "computer-readable medium" or "machine-readable medium". While the communication device-readable medium 422 is illustrated as a single medium, the term "communication device-readable medium" may include a single medium or multiple media (es., a centralized or distributed database, and/or associated caches and servers) configured to store the one or more instructions 424. The term "communication device-readable medium" is inclusive of the terms "machine-readable medium" or "computer-readable medium", and may include any medium that is capable of storing, encoding, or carrying instructions (e.g., instructions 424) for execution by the communication device 400 and that cause the communication device 400 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 424 may further be transmitted or received over a communications network 426 using a transmission medium via the network interface device 420 utilizing any one of a number of transfer protocols. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input-multiple-output (SIMO), MIMO, or multiple-input-single-output (MISO) techniques. in some examples, the network interface device 420 may wirelessly communicate using Multiple User MIMO techniques.

The term "transmission medium" shall be taken to include any intangible medium that is capable of storing, encoding or carrying instructions for execution by the communication device 400, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus, comprising:
a processor configured to cause a user equipment device (UE) to, in association with a multi-connectivity handover with a source base station (SBS) and a target base station (TBS):
  transmit a measurement report to the SBS, the measurement report triggered based on a measurement event configured by the SBS;
  receive radio resource control (RRC) signaling from the SBS, the RRC signaling including a handover command, the handover command including an indication for multi-connectivity support during handover by the SBS and the TBS;
  configure a first protocol stack associated with the SBS and a second protocol stack associated with the TBS;
  process a packet data convergence protocol (PDCP) protocol data unit (PDU) received at the UE during the handover, using the first protocol stack or the second protocol stack;
  determine a sequence number (SN) of the PDCP PDU received at the UE during the handover;
  perform integrity and deciphering operations of the PDCP PDU to generate a deciphered PDCP PDU using a first set of security keys associated with the SBS or a second set of security keys associated with the TBS based on whether the PDCP PDU is received from the SBS or the TBS;

store the deciphered PDCP PDU in a common buffer shared between the first protocol stack and the second protocol stack;

perform reordering to associate the deciphered PDCP PDU with the first protocol stack or the second protocol stack, based on the determined SN; and perform robust header compression (ROHC) decompression of the deciphered PDCP PDU, subsequent to the reordering.

2. The apparatus of claim 1, wherein the processor is further configured to cause the UE to perform one of the following:

process the PDCP PDU using the first protocol stack, based on detecting the PDCP PDU originates from the SBS; or process the PDCP PDU using the second protocol stack, based on detecting the PDCP PDU originates from the TBS.

3. The apparatus of claim 1, wherein to configure the first protocol stack and the second protocol stack, the processor is further configured to cause the UE to:

configure a first set of security keys for integrity and deciphering operations of data received from the SBS; and configure a second set of security keys for integrity and deciphering operations of data received from the TBS.

4. The apparatus of claim 1, wherein the processor is further configured to cause the UE to:

release the SBS based on a release command from the TBS;

transmit a release completion message to the TBS; and remove the first protocol stack associated with the SBS.

5. The apparatus of claim 4, wherein the processor is further configured to cause the UE to, prior to the release command from the TBS:

perform a random access channel (RACH) procedure with the TBS; and transmit a RRC reconfiguration complete message to the TBS.

6. A user equipment device (UE), comprising:

a radio: and a processor operably connected to the radio and configured to cause the UE to, in association with a multi-connectivity handover with a source base station (SBS) and a target base station (TBS)

transmit a measurement report to the SBS, the measurement report triggered based on a measurement event configured by the SBS;

receive radio resource control (RRC) signaling from the SBS, the RRC signaling including a handover command, the handover command including an indication for multi-connectivity support during handover by the SBS and the TBS;

configure a first protocol stack associated with the SBS and a second protocol stack associated with the TBS;

process a packet data convergence protocol (PDCP) protocol data unit (PDU) received at the UE during the handover, using the first protocol stack or the second protocol stack;

determine a sequence number (SN) of the PDCP PDU received at the UE during the handover;

perform integrity and deciphering operations of the PDCP PDU to generate a deciphered PDCP PDU using a first set of security keys associated with the SBS or a second set of security keys associated with the TBS based on whether the PDCP PDU is received from the SBS or the TBS;

store the deciphered PDCP PDU in a common buffer shared between the first protocol stack and the second protocol stack;

perform reordering to associate the deciphered PDCP PDU with the first protocol stack or the second protocol stack, based on the determined SN; and perform robust header compression (ROHC) decompression of the deciphered PDCP PDU, subsequent to the reordering.

7. The UE of claim 6, wherein the processor is further configured to cause the UE to:

release the SBS based on a release command from the TBS;

transmit a release completion message for transmission to the TBS; and remove the first protocol stack associated with the SBS.

8. The UE of claim 7, wherein the processor is further configured to cause the UE to:

prior to the release command from the TBS:

perform a random access channel (RACH) procedure with the TBS; and transmit a RRC reconfiguration complete message to the TBS.

9. The UE of claim 6, wherein the processor is further configured to cause the UE to:

perform one of the following:

process the PDCP PDU using the first protocol stack, based on detecting the PDCP PDU originates from the SBS; or process the PDCP PDU using the second protocol stack, based on detecting the PDCP PDU originates from the TBS.

10. A method, comprising:

at a user equipment device (UE), in association with a multi-connectivity handover with a source base station (SBS) and a target base station (TBS):

transmitting a measurement report to the SBS, the measurement report triggered based on a measurement event configured by the SBS;

receiving radio resource control (RRC) signaling from the SBS, the RRC signaling including a handover command, the handover command including an indication for multi-connectivity support during handover by the SBS and the TBS;

configuring a first protocol stack associated with the SBS and a second protocol stack associated with the TBS;

processing a packet data convergence protocol (PDCP) protocol data unit (PDU) received at the UE during the handover, using the first protocol stack or the second protocol stack;

determining a sequence number (SN) of the PDCP PDU received at the UE during the handover;

performing integrity and deciphering operations of the PDCP PDU to generate a deciphered PDCP PDU using a first set of security keys associated with the SBS or a second set of security keys associated with the TBS based on whether the PDCP PDU is received from the SBS or the TBS;

storing the deciphered PDCP PDU in a common buffer shared between the first protocol stack and the second protocol stack;

performing reordering to associate the deciphered PDCP PDU with the first protocol stack or the second protocol stack, based on the determined SN; and performing robust header compression (ROHC) decompression of the deciphered PDCP PDU, subsequent to the reordering.

11. The method of claim 10, further comprising one of the following:

processing the PDCP PDU using the first protocol stack, based on detecting the PDCP PDU originates from the SBS; or processing the PDCP PDU using the second protocol stack, based on detecting the PDCP PDU originates from the TBS.

12. The method of claim 10, further comprising:

configuring a first set of security keys for integrity and deciphering operations of data received from the SBS; and configuring a second set of security keys for integrity and deciphering operations of data received from the TBS.

13. The method of claim 10, further comprising:

releasing the SBS based on a release command from the TBS;

transmitting a release completion message to the TBS; and removing the first protocol stack associated with the SBS.

14. The method of claim 13, further comprising:

prior to the release command from the TBS:

performing a random access channel (RACH) procedure with the TBS; and transmitting a RRC reconfiguration complete message to the TBS.

* * * * *